(12) United States Patent
Chao

(10) Patent No.: US 7,027,071 B2
(45) Date of Patent: Apr. 11, 2006

(54) SELECTING ELEMENTS FROM AN ELECTRONIC DOCUMENT

(75) Inventor: Hui Chao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 10/186,692

(22) Filed: Jul. 2, 2002

(65) Prior Publication Data
US 2004/0004625 A1    Jan. 8, 2004

(51) Int. Cl.
*G09G 5/00* (2006.01)
(52) U.S. Cl. .................................... 345/622; 715/513
(58) Field of Classification Search ............... 345/622; 715/798, 801, 858, 513
See application file for complete search history.

(56) References Cited

U.S. PATENT DOCUMENTS

| | | | | |
|---|---|---|---|---|
| 5,437,008 A | * | 7/1995 | Gay et al. .................... | 715/502 |
| 5,555,357 A | * | 9/1996 | Fernandes et al. .......... | 345/441 |
| 5,812,862 A | * | 9/1998 | Smith et al. ................. | 715/515 |
| 5,861,886 A | * | 1/1999 | Moran et al. ................ | 345/863 |
| 6,567,109 B1 | * | 5/2003 | Todd ........................... | 715/862 |
| 2002/0081040 A1 | * | 6/2002 | Uchida ....................... | 382/311 |
| 2002/0122067 A1 | * | 9/2002 | Geigel et al. ............... | 345/788 |
| 2003/0179235 A1 | * | 9/2003 | Saund et al. ................ | 345/764 |

OTHER PUBLICATIONS

Adobe® Acrobat 4.0, Copyright © 1999.*
Microsoft® Word 2000, Copyright © 1983-1999.*
"Vision 2000 Standard Edition User Guide", 1999, Visio Corporation, pp. 21, 22, 69.*

* cited by examiner

Primary Examiner—Richard Hjerpe
Assistant Examiner—Michelle K. Lay

(57) ABSTRACT

A computing device comprises a processor and a memory. The processor is operable to select a plurality of related graphics elements for extraction from an electronic document. The selection of the plurality of related graphics elements includes creating a graphics region in the electronic document, and the graphics region includes an expandable area in the document encompassing the plurality of related graphics elements. The memory stores the electronic document from which the plurality of related graphics elements are extracted.

52 Claims, 15 Drawing Sheets

SELECTING ELEMENTS FROM AN ELECTRONIC DOCUMENT

FIELD OF THE INVENTION

The invention is generally related to electronic data files. More particularly, the invention is related to selecting elements from an electronic document.

BACKGROUND OF THE INVENTION

Electronic documents may be created using a variety of techniques. Thus, it may be desirable to store data from an electronic file in a format that is independent of the process used to create it, so the electronic document may be accessible to a range of users. One format that allows such access is the portable document format ("pdf"). Pdf is a file format for representing documents in a manner independent of the application software, hardware, and operating system used to create the documents and independent of the output device on which they are displayed or printed.

A pdf workflow assumes a one-way production process where the pdf document contains a rendition of document elements that are laid out for final presentation, i.e., no logical structural information is typically preserved for the document elements. Consequently, one problem with storing documents in a pdf format is that it is difficult to reuse parts of documents, because elements with semantic affinity are not stored as one logical group of elements. Therefore, it is difficult to select related elements of a pdf document that are desired by the user to be reused.

For example, it may be desirable for a user to insert a graph or chart from a pdf document into a document of the user's own creation or make a slide presentation with the graph or chart. However, most pdf documents do not generally support sharing or repurposing the content of the document, and it is generally difficult to select for reuse all the elements for a figure, an illustration or a paragraph as an integrated object from PDF.

There are a few techniques available for reusing pdf document content. However, the available techniques are complicated and may require extensive user interaction. For example, one complicated technique may extract a raster rendition of a selected document portion from a display bitmap. However, all the original document structure and attribute information is lost, as well as resolution, which is usually limited to the 72 dpi screen resolution. Therefore, the selected portion may not be readily assembled on a new document.

SUMMARY OF THE INVENTION

According to an embodiment of the invention, a method of selecting elements from an electronic document comprises identifying a largest graphics element in a page of the electronic document; creating a graphics region in the page, the graphics region including an expandable area in the page including at least the largest graphics element; determining whether at least one bounding box for at least one other graphics element is in a vicinity of the graphics region; and growing the graphics region to further include the at least one other graphics element in response to the at least one bounding box being in the vicinity of the graphics region.

According to yet another embodiment of the invention, an apparatus configured to select elements from an electronic document comprises means for identifying a largest graphics element in a page of the electronic document; means for creating a graphics region that includes the largest graphics element; means for determining whether at least one bounding box for at least one other graphics element is in a vicinity of the graphics region; and means for growing the graphics region to include the at least one other graphics element in response to the at least one bounding box being in the vicinity of the graphics region.

According to yet another embodiment of the invention, a computing device comprises a processor operable to select a plurality of related graphics elements for extraction from an electronic document. Selecting the plurality of related graphics elements includes creating a graphics region in the electronic document. The graphics region includes an expandable area in the document including the plurality of related graphics elements. The computing device also comprises a memory storing the electronic document.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to unnecessarily obscure the invention.

Figure 1:
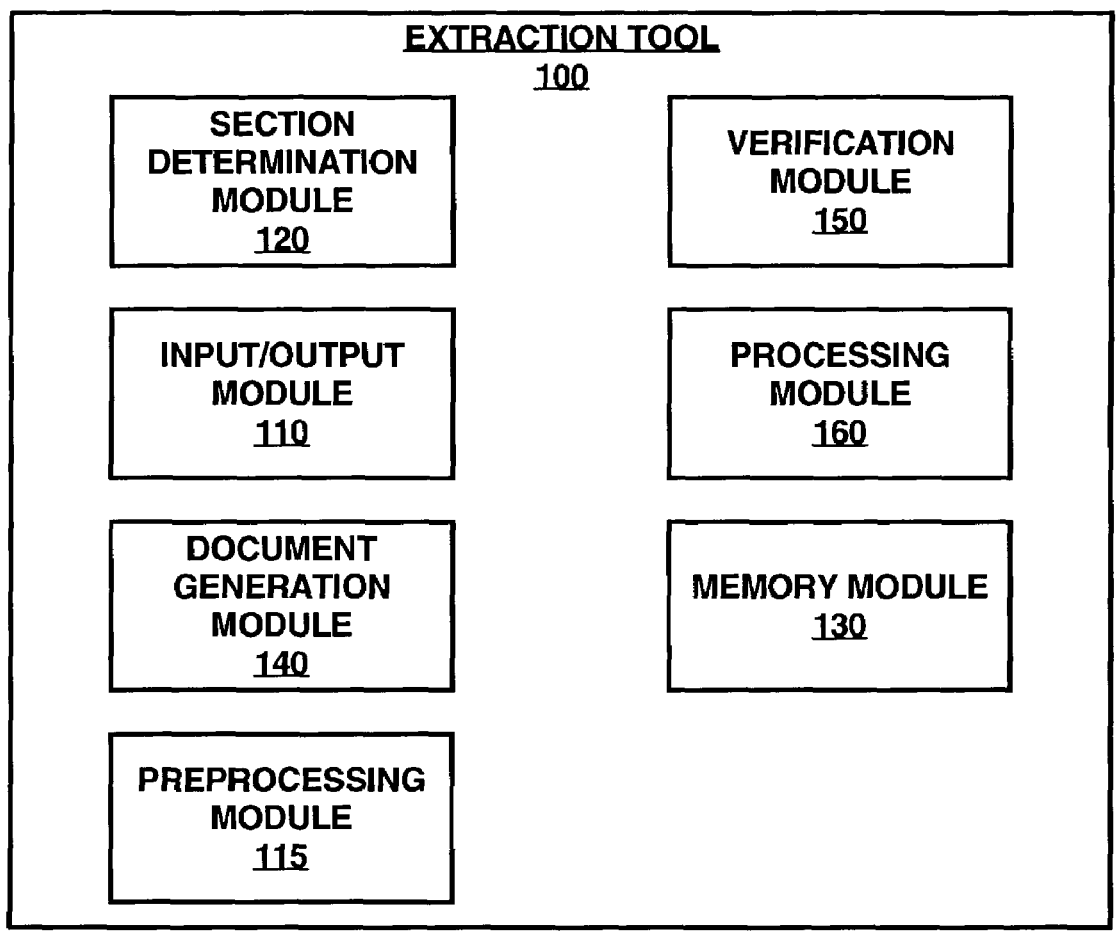
FIG. 1 is a block diagram of an extraction tool, according to an embodiment of the invention.

FIG. 1 is a block diagram illustrating one embodiment of a graphics extraction tool 100. The graphics extraction tool 100 includes modules 110–160 for extracting logically related graphics elements from an electronic document (e.g., a pdf document). The graphics extraction tool 100, when invoked, may automatically select a group of graphics elements (i.e., a graphics group) that are related, such as a group of independent graphics elements that collectively form a table, graph, figure, etc., in a pdf document. After a graphics group is identified, the group may be extracted and used in other documents.

The graphics extraction tool 100 may include an input/output module 110, a preprocessing module 115, a section determination module 120, a memory module 130, a document generation module 140, a verification module 150 and a processing module 160. The modules 110–160 are shown to be located within the graphics extraction tool 100 for conceptual purposes only. In other embodiments, one or more of the modules 110–160 may reside outside of the extraction tool 100 and may be called upon by the graphics extraction tool 100 as needed.

The input/output module 110 may receive instructions from a user or software (e.g., an application, a software tool, a software module, etc.) to invoke the graphics extraction tool 100 to extract graphics from a pdf document. For example, a user may select a button on a pdf reader to invoke the graphics extraction tool 100 or the graphics extraction tool may be invoked by software.

The preprocessing module 115 may remove all invisible graphics elements (e.g., graphics elements without stroke and fill, graphics elements without stroke and with white fill, graphics elements completely covered by other elements, graphics elements mostly outside of a page, etc.). The preprocessing module 115 may also remove headers, footers, and stylistic patterns (e.g., background water mark).

The section determination module (SDM) 120 may determine what graphics elements of the pdf document should be extracted. For example, the SDM 120 may apply rules of inclusion to determine if graphics elements in the pdf document are logically related. The SDM 120 may form a graphics group including all the elements to be extracted. The graphics group, for example, is a list of all the elements (e.g., graphics elements, text elements, image elements, etc.) to be extracted.

The memory module 130 may be used to store image information, data, instructions or any other information usable for extracting a graphics group from a pdf document. For example, the memory may be used to store graphics elements in a graphics group while the SDM 120 determines what graphics elements will be included in the extraction region.

The document generation module 140 may generate a new document by extracting the elements in the region determined by the SDM 120 into the new document. In one embodiment, the document generation module 140 may extract a graphics group into a new pdf document.

The verification module 150 may verify the accuracy of the extracted region in the new document generated by document generation module 140. In one embodiment, the verification module 150 may convert the original document and the new document generated by the document generation module 140 into bitmap images for comparison.

The processing module 160 may execute the processes for extracting graphics elements and other elements using instructions received from modules 110, 120, 140 and 150. For example, the processing module 160 may increase the size of a graphics region containing graphics elements based on instructions or inclusion rules from the SDM 120. An example of an inclusion rule is to encompass all graphics elements that intersect an expanded graphics region.

Figure 2A:
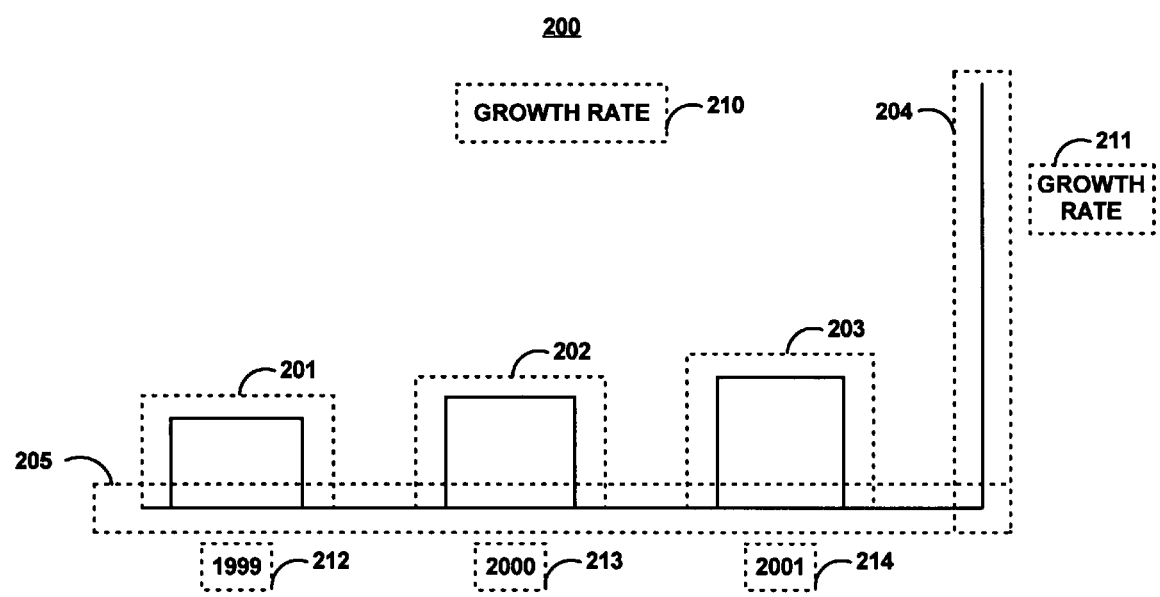
FIGS. 2A–D illustrate growing a graphics region for selecting elements from an electronic document, according to an embodiment of the invention.

A pdf document may include, for example, text elements, graphics elements and image elements. FIGS. 2A–D illustrate growing a graphics region 220 on an exemplary pdf page 200 to select a plurality of related graphics elements, which may be extracted. As shown in FIG. 2A, the page 200 includes graphics elements surrounded by respective bounding boxes 201–205 and text elements surrounded by respective bounding boxes 210–214. Although a single page 200 is illustrated, a pdf document may include one or more pdf pages having elements that may be selected by the graphics tool 100. The text elements include text runs, which are characters having similar attribute(s) (e.g., same font, same font size, all bold, all normal, etc.). The graphics elements, also known as path elements or graphic primitives, may include arbitrary shapes comprised of a sequence of straight lines, rectangles and/or cubic Bezier curves.

Bounding boxes (e.g., 201–205 and 210–214) are rectangles which surround objects in a document, and may refer to a rectangle which entirely encloses the object on a page. The bounding box location and size for each element may be obtained, for example, through ADOBE ACROBAT Software Development Tool Kit Application Programmer Interface, where a bounding box is guaranteed to encompass the element, but is not necessarily the smallest box that contains the element. To achieve higher accuracy for selecting and extracting the desired elements, a bounding box may be modified to be the smallest bounding box containing the element. For example, for a rectangular shaped graphics element, the bounding box may be modified to be the outline of the rectangle itself. Bounding boxes are typically invisible to a viewer of a pdf document.

The SDM 120 may determine what graphics elements of the pdf document 200 are selected using rules of inclusion. For example, the SDM 120 may apply rules of inclusion to determine if graphics elements in the pdf document are logically related.

A graphics region may include a rectangular area generated by the SDM 120 that includes all elements of the page 200 that are logically related. Graphics elements and other related elements in the graphics region are eventually extracted by the graphics tool 100. In the page 200, the graphics region 220 (shown in FIGS. 2B–D) includes all the elements including and logically related to the Growth Rate Table.

Figure 2B:
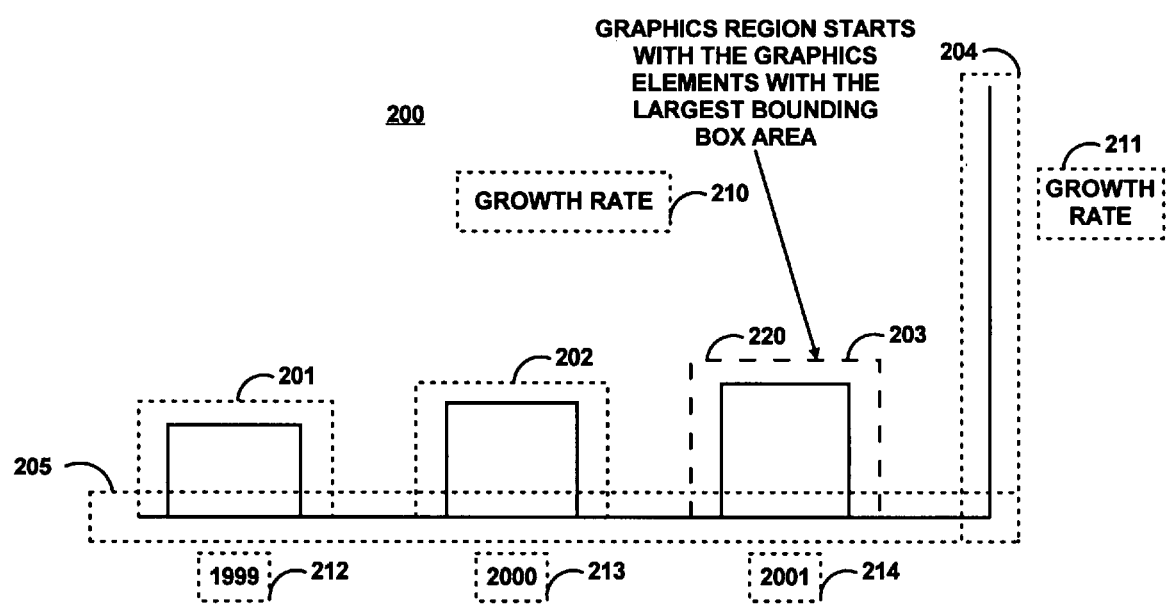
Figure 2C:
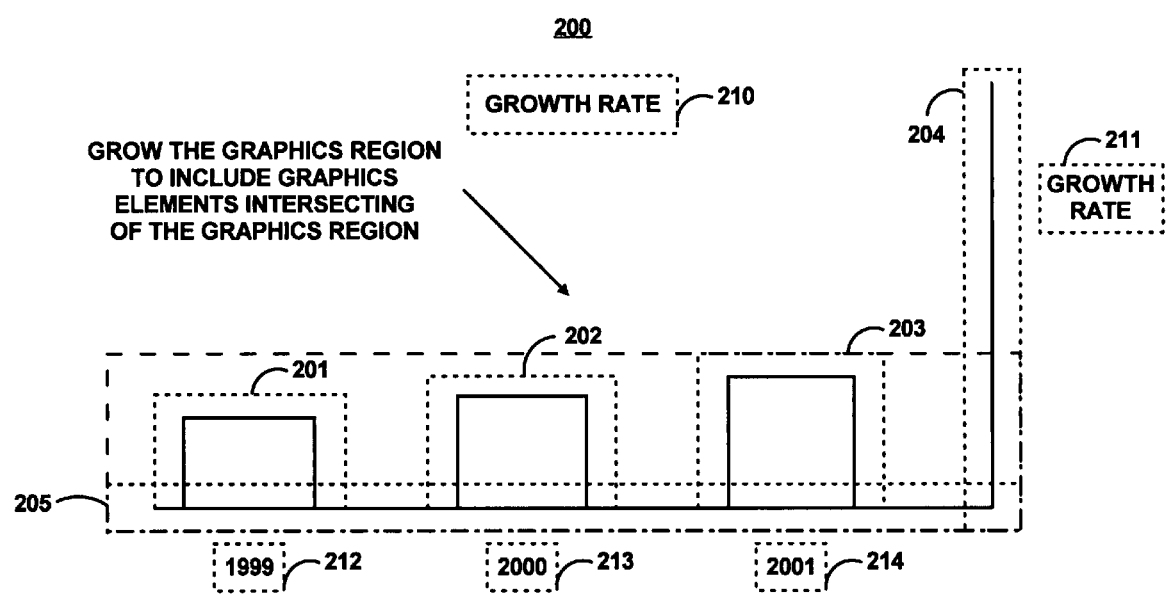
Figure 2D:
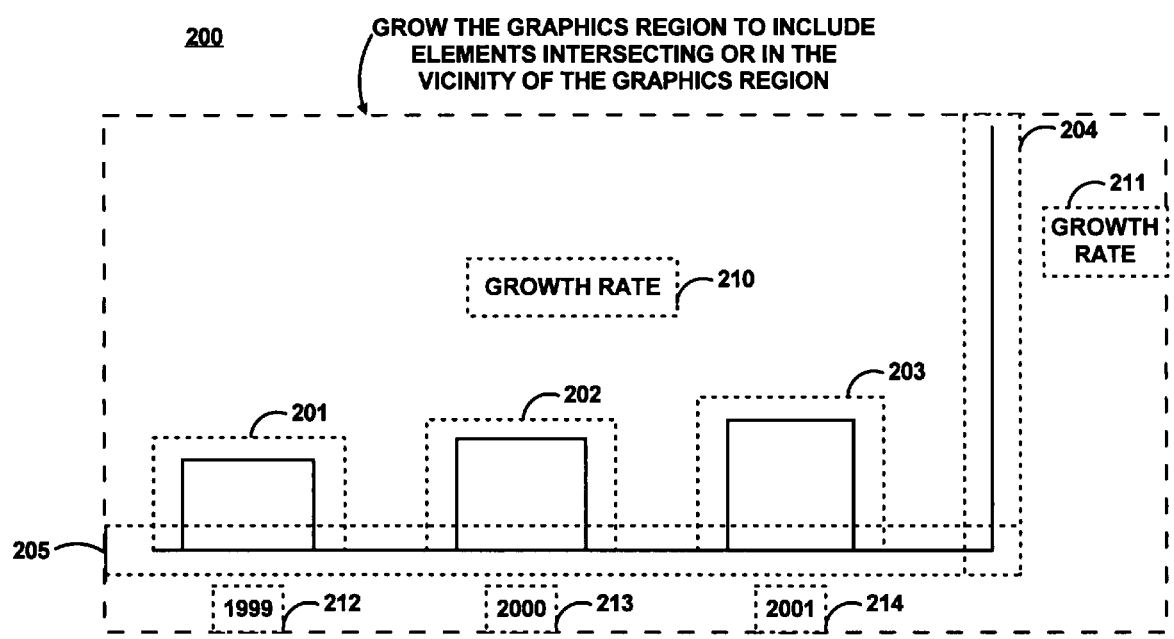

As shown in FIG. 2B, in order to identify all the elements that are logically related, the SDM 120 may start the graphics region 220 with the bounding box of the largest graphics element in the page 200, such as the graphics element surrounded by the bounding box 203. Then, as shown in FIG. 2C, the SDM 120 may grow the graphics region 220 to include graphics elements intersecting the graphics region 220 shown in FIG. 2B. As shown in FIG. 2C, the graphics region is grown to include graphics elements 205. As shown in FIG. 2D, the graphics region 220 is grown again to include graphic elements 201, 202, 204, text elements 210 and other elements in the vicinity and intersecting the graphics region 220 shown in FIG. 2C. The result of growing again is the graphics region 220 includes all the elements shown in FIG. 2D, which are logically related to the Growth Rate Table. The process of re-growing the graphics regions 220 may be repeated until all the elements logically related to the graphics elements are included in the graphics region, which may be determined by the rules of inclusion described below with respect to the methods.

After a determination is made that the graphics region 220 includes all logically related elements, the elements within the graphics region 220 may be extracted for storage in a memory and/or for incorporation into a new document.

Figure 3:
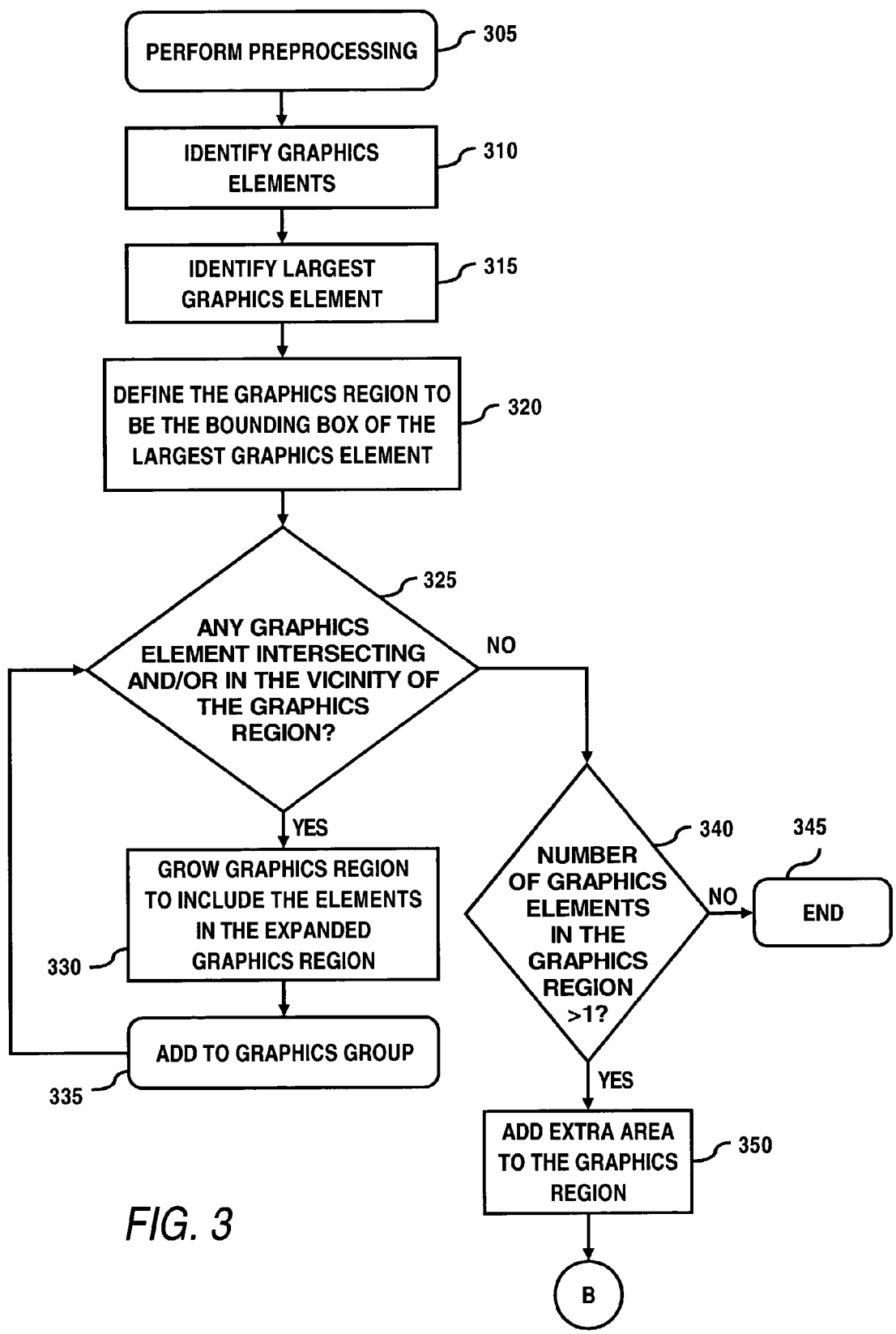
FIG. 3 illustrates a flow diagram of a method for creating and growing a graphics region, according to an embodiment of the invention.

FIG. 3 illustrates a flow chart of an exemplary method 300 for selecting elements of an electronic document, according to an embodiment of the invention. In step 305, the preprocessing module 105 excludes invisible elements (e.g., graphics elements without stroke and fill, graphics elements without stroke and with white fill, graphics elements completely covered by other elements, graphics elements mostly outside of a page, etc.) from being selected. These elements may not be useful to a user that needs particular graphics and logically related elements extracted from a page in the document. In step 310, the SDM 120 identifies the graphics elements in the page of, for example, a pdf document. In step 315, the SDM 120 identifies the largest graphics element from the identified graphics elements. The size of the graphics elements may be determined using coordinate information provided with each bounding box for each graphics element. Coordinate information is an attribute typically provided in pdf documents. The graphics elements may be sorted by size in a list, and the largest graphics element (e.g., the graphics element on top of the sorted list) is selected.

In step 320, a graphics region is created that includes the largest graphics element. The size of the graphics region may be equal to the bounding box for the largest graphics element. The SDM 120 may instruct the processing module 160 to create and expand the graphics region to include the largest graphics element.

Figure 4:
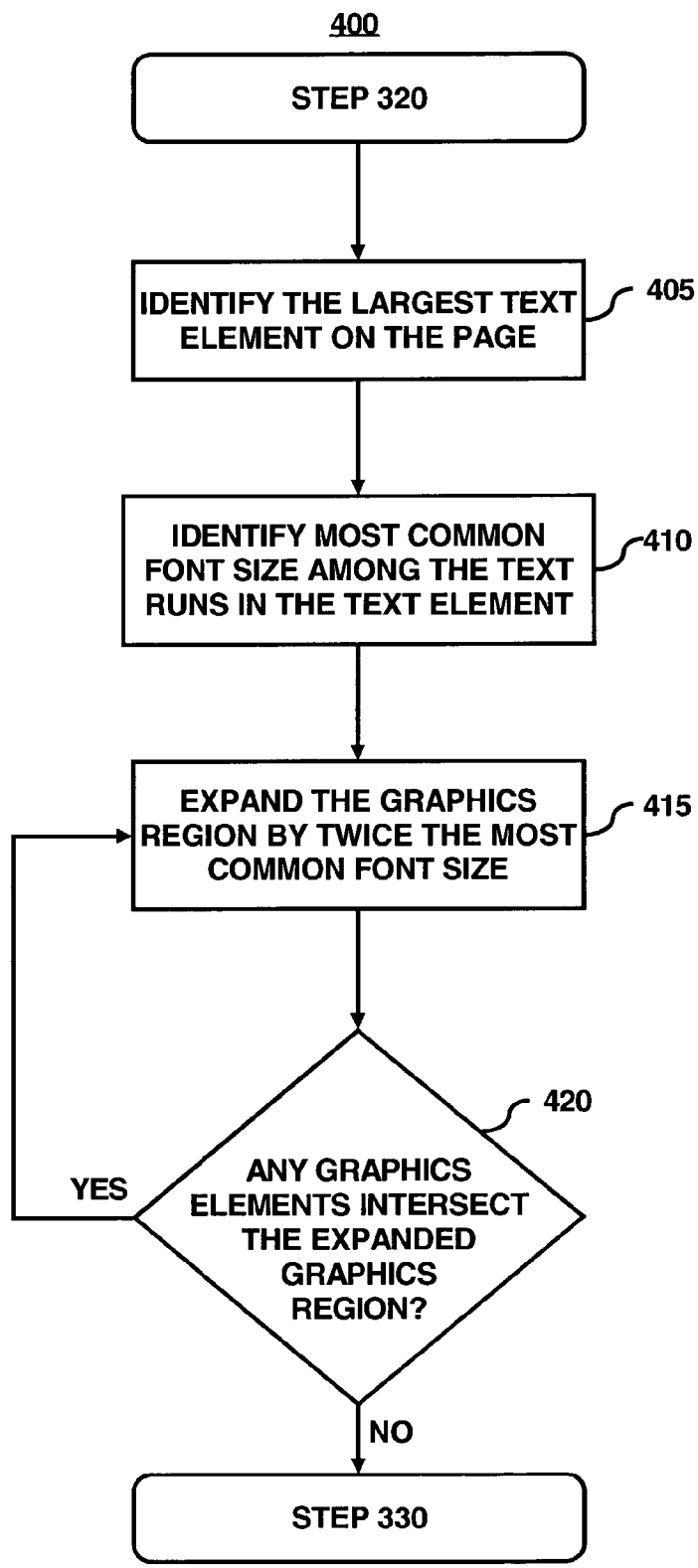
FIG. 4 illustrates a flow diagram of a method for identifying graphic elements in the vicinity of graphics region, according to an embodiment of the invention.

In step 325, the SDM 120 determines whether a bounding box for a graphics element intersects or is in the vicinity of the graphics region created in step 320. For example, each bounding box in the sorted list is analyzed to determine whether each bounding box intersects the graphics region. An intersecting bounding box includes bounding boxes that overlap or share a common boundary. An illustration of a common boundary is shown in FIG. 2A. For example, the bottom of the bounding box 201 and the bottom of the bounding box 205 share a common boundary. These bounding boxes also happen to overlap, but intersecting bounding boxes may not overlap. Sub-steps for identifying graphics elements within the vicinity of the graphics region are illustrated in FIG. 4 and described in detail below. Generally, the graphics region is expanded to identify elements intersecting and/or in the vicinity of the graphics region. Then, the graphics region is grown (see step 330).

In step 330, the graphics region is grown to include the elements identified in step 325. The elements included within the graphics region are added to the graphics group (step 335). Steps 330 and 335 may be performed repeatedly until no more new elements can be identified.

In step 340, if no graphics elements are intersecting and/or in the vicinity of the graphics region, as determined in step 325, the SDM 120 determines whether the number of graphics elements in the graphics region is greater than one. If the number of graphics elements is not greater than one, graphics elements are not selected and are not extracted (step 345). If no bounding boxes for graphics elements intersect the graphics region, then the graphics region likely includes a single graphics element. A pdf document may include a special graphics element, such as a line before the footer and all text elements. This special graphics element may not be of use to a user if extracted. If the number of graphics elements is greater than one, a small area (e.g., twice a font size in width and height) is added to the graphics region (step 350). Step 350 is optional and may be performed to include small elements related to a graphics element in the graphics region in subsequent steps. After step 350, steps shown in FIGS. 5A–D may be performed.

FIG. 4 illustrates a flow diagram of an exemplary method 400, according to an embodiment of the invention, for identifying graphics elements within a vicinity of the graphics region. The steps for the method 400 may be performed when step 325 in the method 300 (shown in FIG. 3) is invoked.

In step 405, the SDM 120 identifies a text element having the largest bounding box or having the largest number of characters on the page of the pdf document. In step 410, the SDM 120 identifies the most common font size among text run elements within the text element identified in step 405. A large text element may include multiple text runs. Although a text element may include multiple text runs, each having a different font size, a text run typically has only one font size. The most common font size among text runs may be used. Alternatively, a text run with the largest number of characters or a font size for a text run in the middle of the text element may be selected. Font size information may be retrieved from attributes associated with the text run.

In step 415, the graphics region is expanded by twice the size of the font identified in step 410. The height and/or the width may be expanded by twice the font size. In step 420, the SDM 120 determines whether any bounding boxes for graphics elements intersect the expanded graphics region. If any graphics elements intersect the graphics region, as determined in step 420, the graphics region is expanded to include those elements. Step 420 may be repeated with step 330 in the method 300 such that the graphics region is expanded until no graphics elements intersecting the expanded graphics region can be identified.

The graphics region may be further expanded to include related elements as described with respect to FIGS. 5A–D. The related elements may include non-graphics elements logically related to the graphics elements in the graphics region. FIGS. 5A–D illustrate steps that may be performed after step 350, shown in FIG. 3.

Figure 5A:
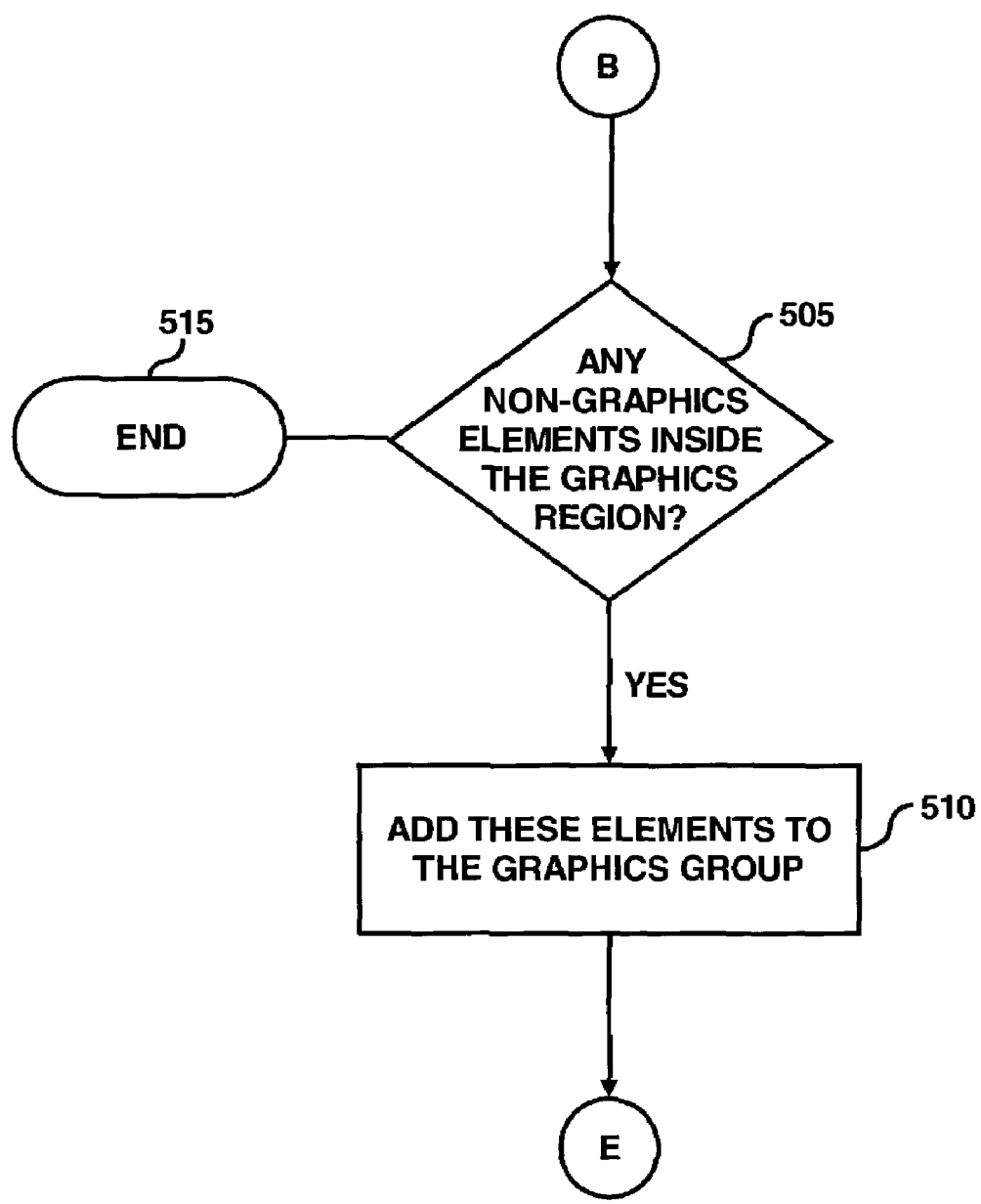
FIGS. 5A–D illustrate a flow diagram of methods for growing the graphics region to include non-graphics elements, according to embodiments of the invention.

FIG. 5A illustrates a method 500, according to an embodiment of the invention. In step 505, the SDM 120 determines whether any bounding boxes for non-graphic elements are inside the graphics region. If any non-graphics elements are inside the graphics region, these elements are added to the graphics group (step 510) and may subsequently be extracted. If no non-graphics elements are inside the graphics region, elements are not added to the graphics group in this method (step 515).

Figure 5B:
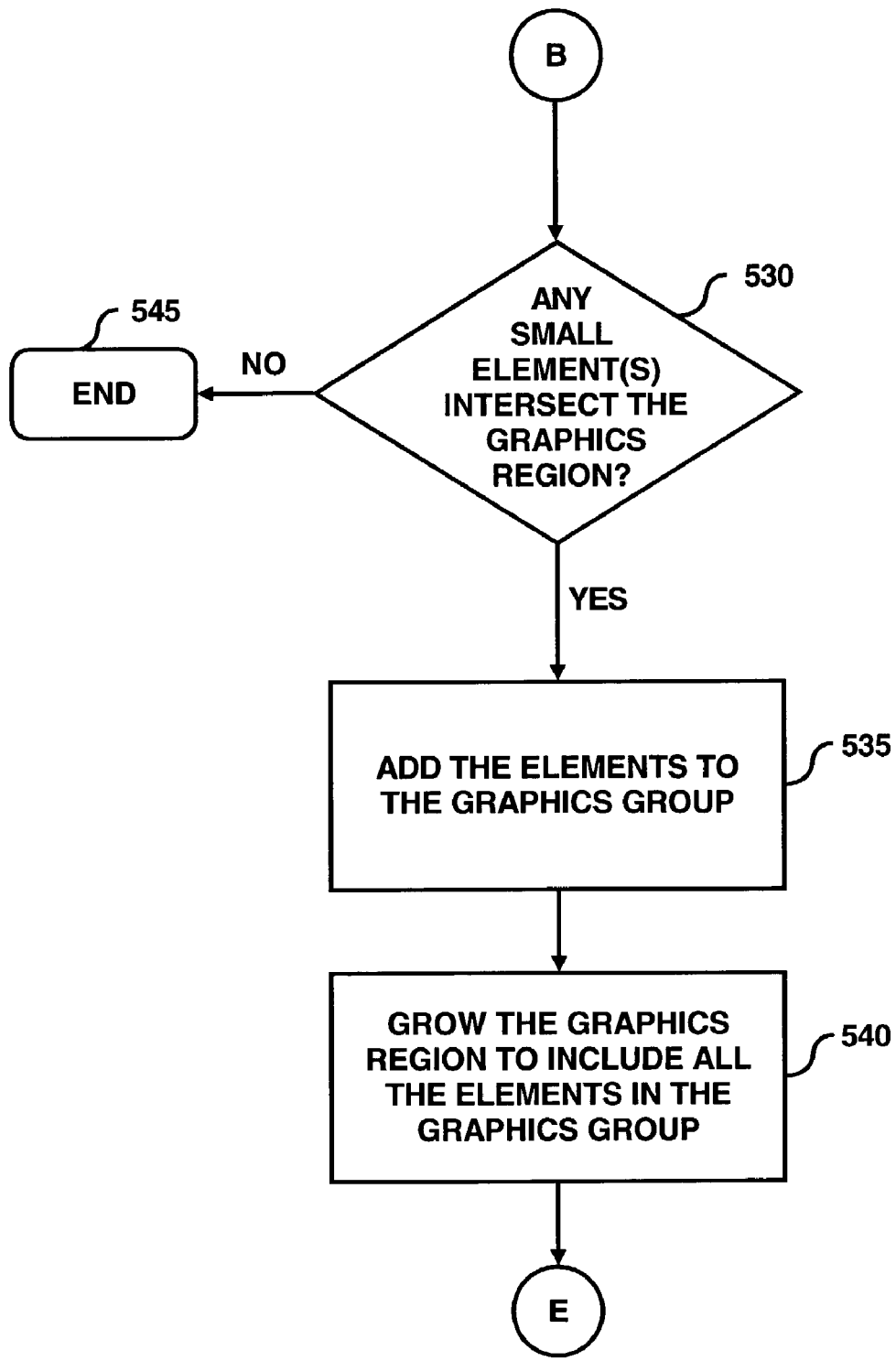

FIG. 5B illustrates a method 525, according to an embodiment of the invention. In step 530, the SDM 120 determines whether any bounding boxes for small elements intersect the graphics region. A small element, for example, may be an element having a bounding box area approximately less than or equal to 0.8 of the area of the graphics region. The 0.8 threshold, however, is an example, and the threshold can vary as defined. Also, the threshold may be defined by the software for the graphics extraction tool 100.

In step 535, small elements having bounding boxes intersecting the graphics region may be added to the graphics group, and the graphics region is grown to include these elements (step 540). Therefore, small elements logically related to the elements in the graphics group and in close proximity on the page to those elements may be extracted. In step 545, if no small elements are identified in step 530, the graphics region is not grown in this method.

Figure 5C:
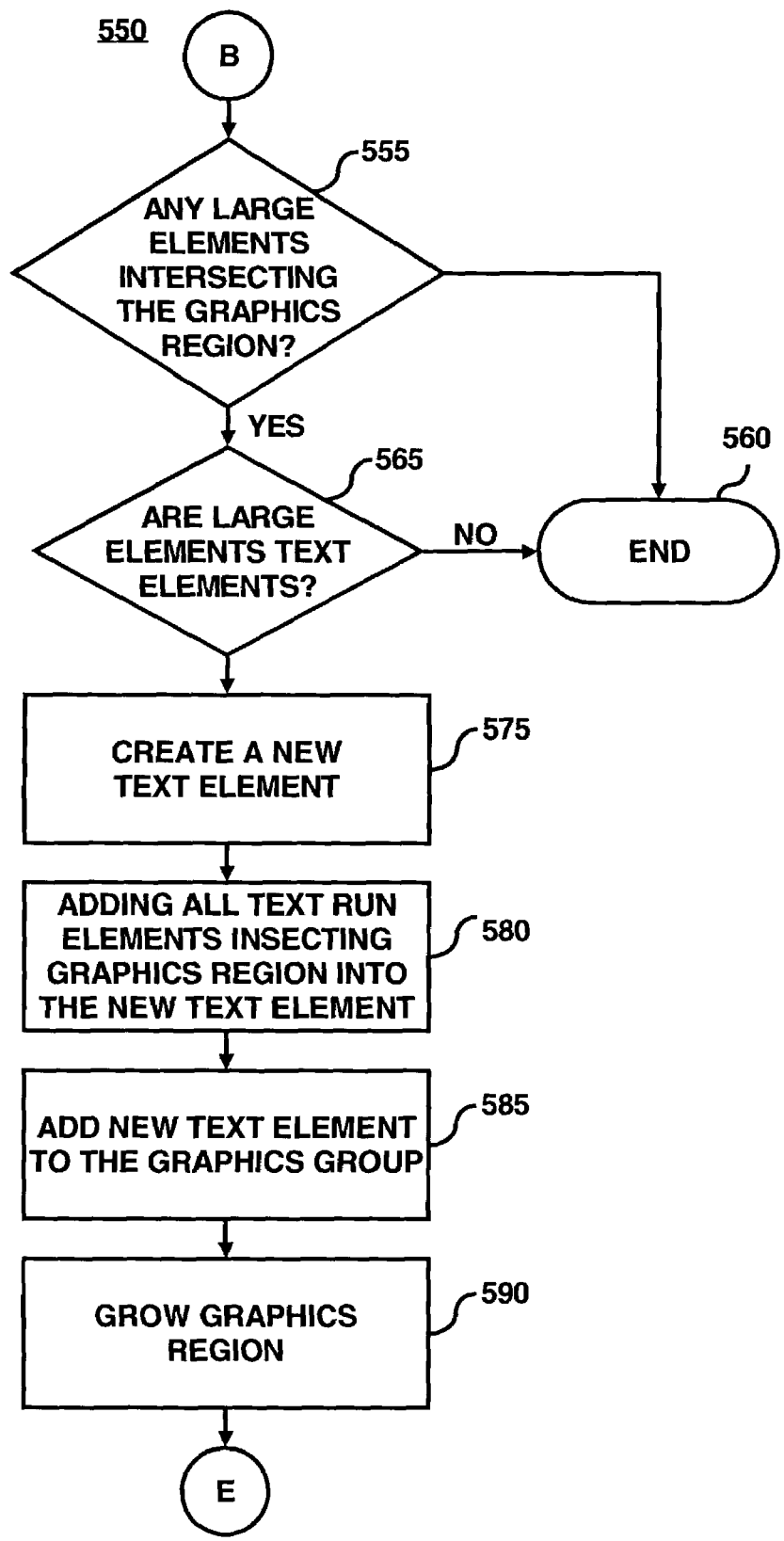

FIG. 5C illustrates a method 550, according to another embodiment of the invention, for adding text elements to the graphics region. In step 555, the SDM 120 determines whether any bounding boxes for large elements intersect the graphics region. A large element, for example, may include an element with a bounding box area greater than a percentage (e.g., 75%, 80%, etc.) of the graphics region. If a large element intersects the graphics region (as determined in step 555), the SDM 120 determines whether the large element is a text element (step 565). If a large element does not intersect the graphics region (as determined in step 555), the graphics region is not expanded in this method (step 560). Also, if a large element intersects the graphics region and the large element is not a text element, the graphics region is not expanded in this method (step 560).

If the large element is a text element, a new text element is created (step 575). Then, the text runs in the text element identified in step 565 that intersect the graphics bounding box are added to the text element created in step 575. Therefore, captions, titles, etc, that are associated with, for example, a figure may be extracted from the pdf page along with the figure.

In step 585, the elements in the new text element are added to the graphics group, and the graphics region is grown to include these elements (step 590).

Figure 5D:
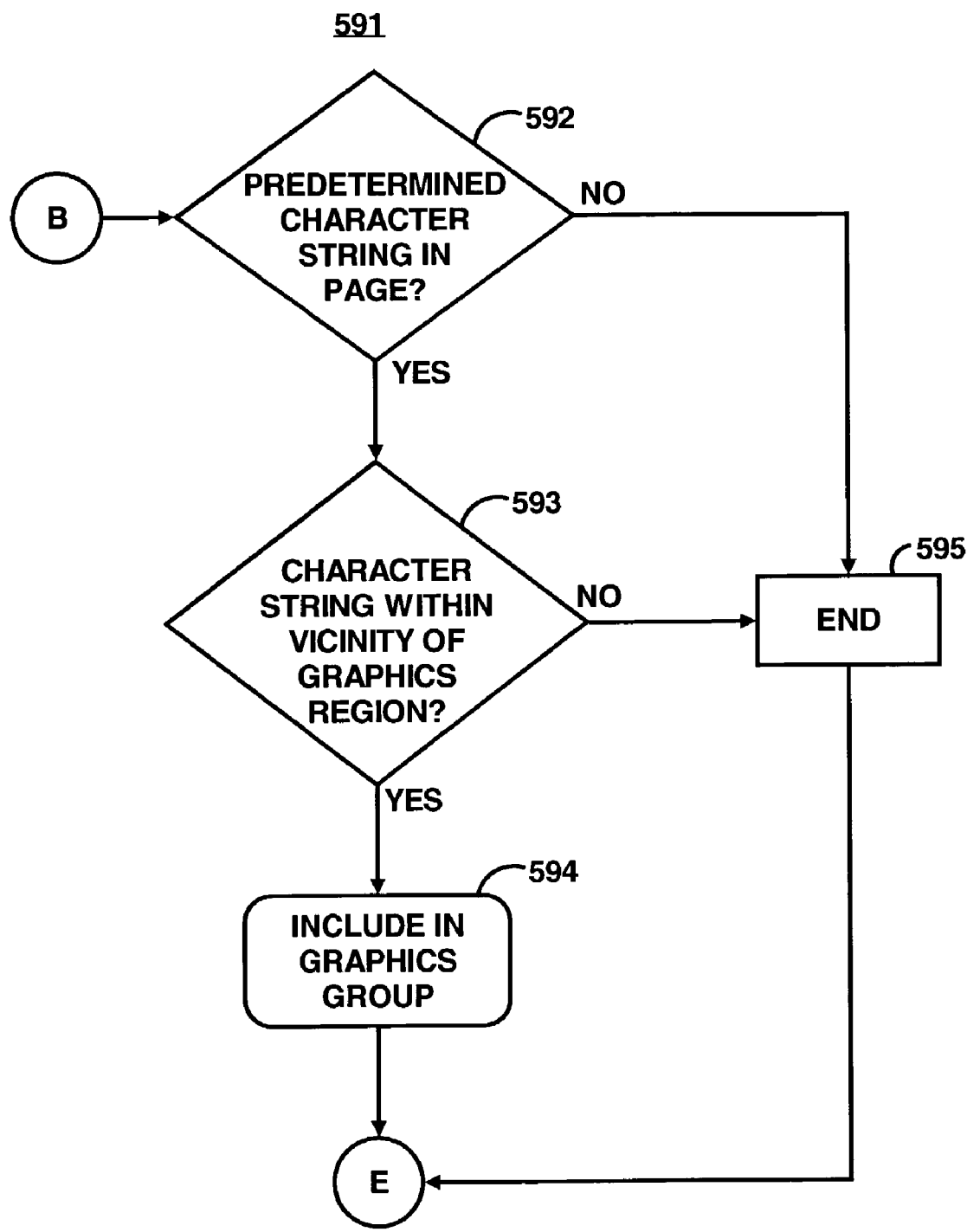

FIG. 5D illustrates a flow diagram 591, according to an embodiment of the invention, for further expanding the graphics region to include text elements that are related to graphics elements to be extracted. In step 592, the SDM 120 determines whether the pdf page includes one or more predetermined character strings. For example, the page is searched for the predetermined character strings. Character strings may include "Fig.", "Figure", "Table", "Chart", etc. These character strings may include characters typically used in the description of related graphics elements. In step 593, if any of the predetermined character stings are found in the page, the SDM 120 determines whether the bounding box for the text element including the character string is within the vicinity of the graphics region. Vicinity may be based upon a font size (e.g., twice a font size in a text run).

In step 594, the text element having the predetermined character string is added to the graphics group if the that text element is within the vicinity of the graphics region. The graphics region may then be grown to include the text element.

If none of the predetermined character strings are found (as determined in step 592), then the graphics region is not grown (step 595). If a predetermined character string identified in step 592 is not within the vicinity of the graphics region (as determined in step 593), then the graphics region is not grown (step 595).

It will be apparent to one of ordinary skill in the art that the methods 500, 525, 550 and 591 may be performed in any order and one or more of the steps in these methods may be combined into one or more methods to eliminate redundant steps.

Figure 6A:
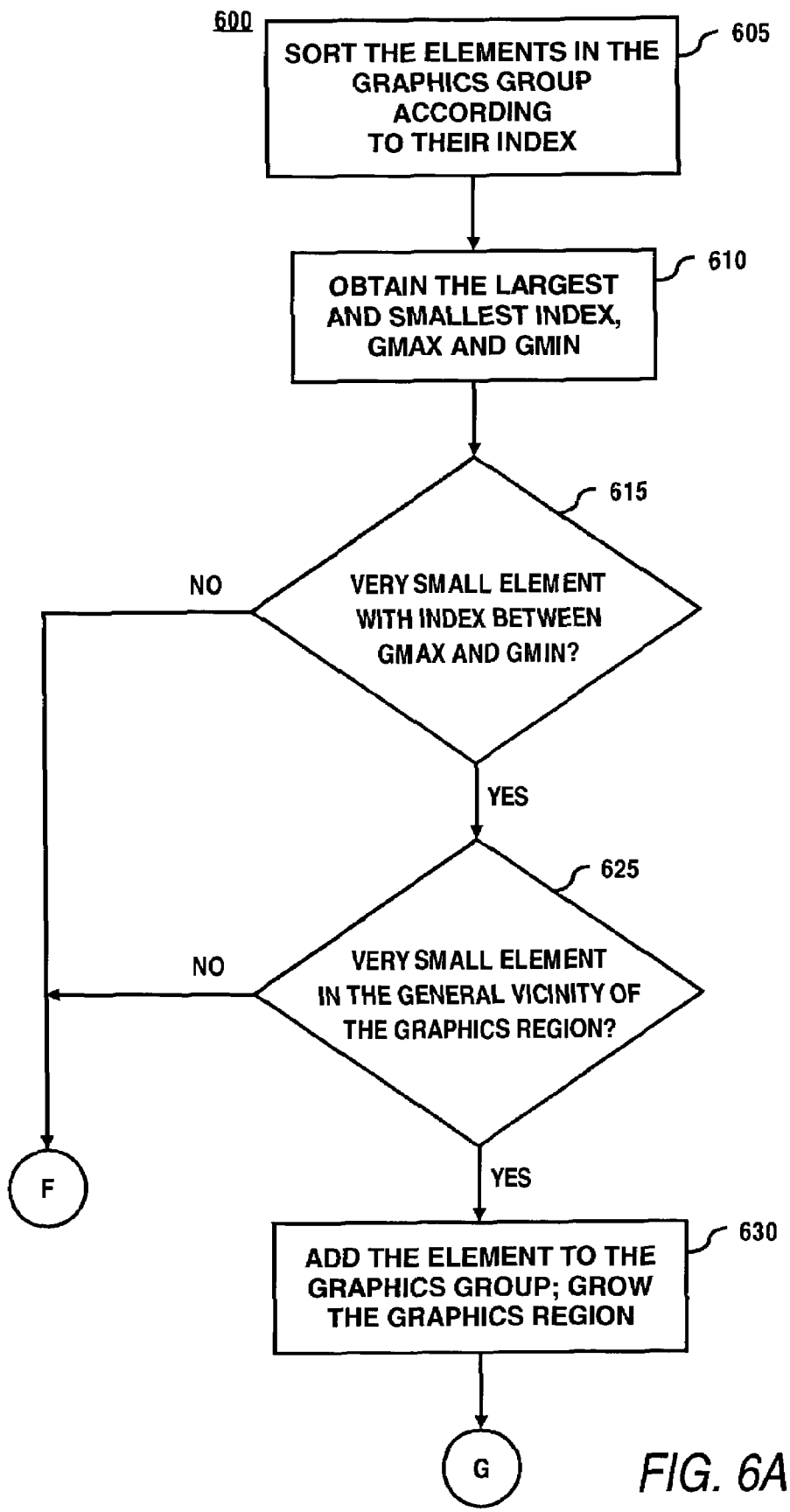
FIGS. 6A–B illustrate flow diagrams of methods for growing the graphics region to include related elements, according to embodiments of the invention.

FIG. 6A illustrates a method 600, according to an embodiment of the invention, which may be used to add very small elements associated with the graphics elements in the graphics region to the graphics region. In step 605, the SDM 120 sorts the elements in the graphics group according to their index. For example, the SDM 120 compiles an index based on an order all the elements are laid on the page. Elements that are logically related to each other on the page tend to be close in the index. For example, graphics elements for a table on a page tend to be placed on the page in succession, and thus have index values close to each other. The SDM then sorts the elements in the graphics group based on their value in the index. For example, a list is created including the elements sorted by their index value. In step 610, the SDM 120 identifies the largest and smallest index values (i.e., Gmax and Gmin) that the elements in the graphics group have.

In step 615, the SDM 120 determines whether very small elements in the page have an index value between Gmax and Gmin. A very small element, for example, may be an element having a bounding box area approximately less than or equal to 0.1 of the graphics region. The 0.1 threshold, however, is an example, and the threshold can vary as defined. The very small elements may generally be smaller than the small elements described in FIG. 5B. Also, the very small elements may be defined by the software. If no very small elements have index values between Gmax and Gmin, no elements are added to the graphics group in this method. Then, step 665 in a method 650, shown in FIG. 6B, may be performed.

If one or more very small graphics elements are identified in step 615, the SDM 120 determines whether the very small graphics elements are within a general vicinity of the graphics region (step 625). The general vicinity may be based on a predetermined value. In one example, the vicinity may include an area approximately equal to the graphics region being expanded by ten times the common font size of the page. The general vicinity may not necessarily be based on font size and can include any predetermined value. Note that the size of the general vicinity may be larger than the size of the vicinity (e.g., twice the most common font size) described previously.

If the very small graphics element(s) are within the general vicinity of the graphics region, they are added to the graphics group and the graphics region is grown to encompass them (step 630). After step 630, steps 680 and 685, shown in FIG. 6B and described below, are performed. If the very small graphics element(s) are not in the general vicinity, as determined in step 625, step 665, shown in FIG. 6B, may be performed.

Figure 6B:
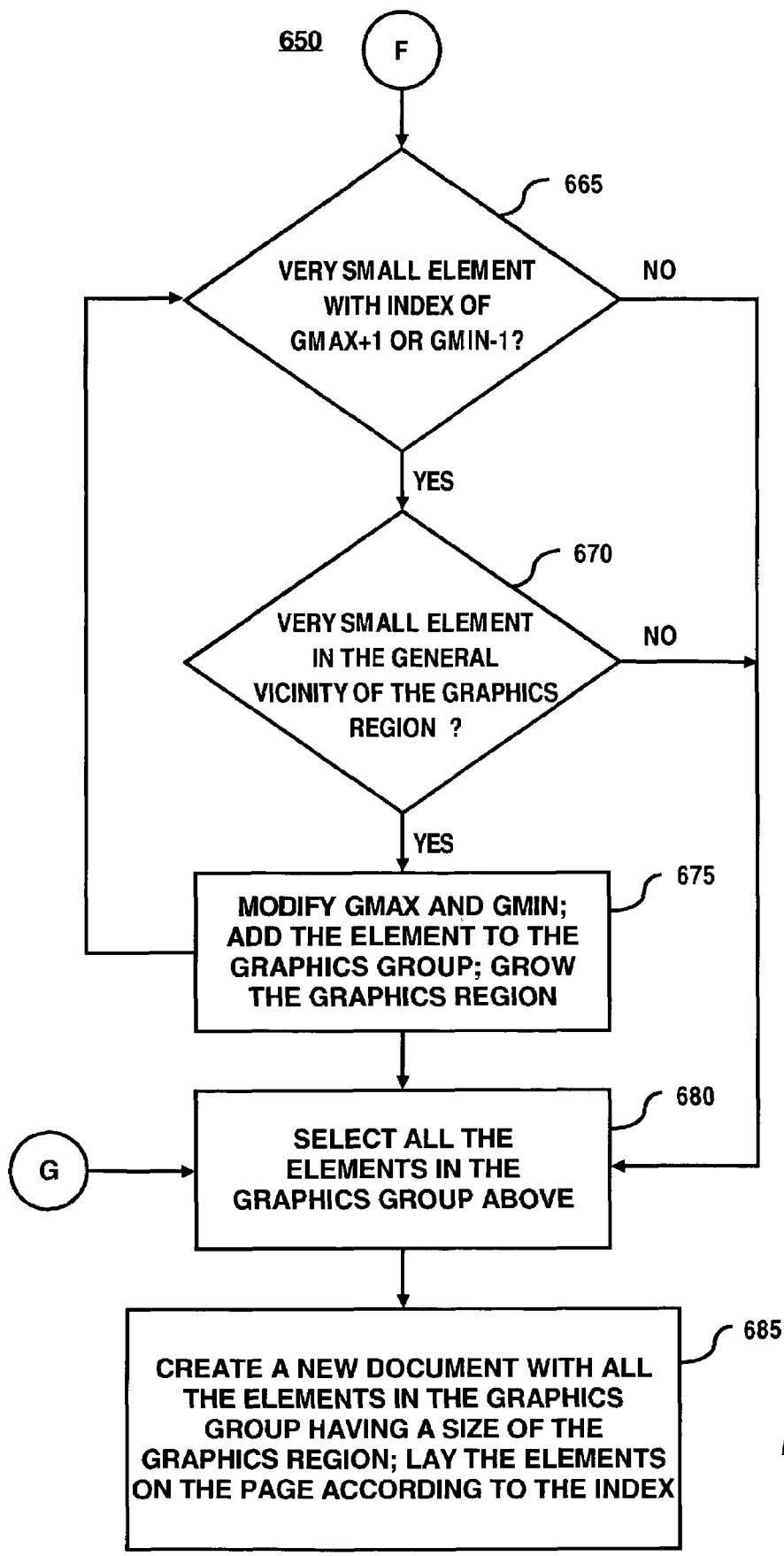

FIG. 6B illustrates a method 650, according to yet an embodiment of the invention, which may be used to add very small elements associated with the graphics elements in the graphics region to the graphics region.

In step 665, the SDM 120 determines whether one or more very small elements have index values outside Gmax and Gmin, but next to Gmax and Gmin (e.g., Gmax+1 and Gmin−1). For example, if Gmax is 10 and Gmin is 2, then very small elements having index values of 11 or 1 are identified. If the SDM 120 determines that no very small elements have index values outside and next to Gmax and Gmin, then step 680 is performed. In step 670, the SDM 120 determines whether any very small elements identified in step 665 are in the general vicinity of the graphics region. If the very small elements are in the general vicinity, the very small elements are added to the graphics group (step 675). Also, Gmax and/or Gmin are modified to include the index value of the very small element(s) (step 675). Steps 665–675 may be repeated if very small elements are initially identified in step 665. If no very small elements are in the general vicinity of the graphics group, as determined in step 670, step 680 is performed.

At the completion of step 630 shown in FIG. 6A or at the completion of one of steps 665–675, step 680 is performed. In step 680, the SDM 120 identifies all the elements in the graphics group. These elements may include elements added to the graphics groups in one or more of the previous methods illustrated in FIGS. 3–5 and the methods 600 and 650 illustrated in FIGS. 6A–B. In step 685, a new document is created, and all the elements in the graphics group are extracted. Extraction may include cutting or copying the elements in the graphics group, such as performed by conventional software applications. The extracted elements may be laid on a page in the new document according to an index.

Steps 615–630 in the method 600 and steps 665–675 in the method 650 may be performed in different orders or substantially simultaneously. For example, steps 665–675 may be performed after steps 605 and 610, instead of steps 615–630. Alternatively, after steps 605 and 610, steps 615–630 and steps 665–675 may be performed substantially simultaneously.

The methods 600 and 650 may be used to grow the graphics region to include elements consecutively placed on the pdf page and within the vicinity of the elements within the graphics group. Elements that meet these criteria may likely be associated with the graphics elements to be extracted and accordingly are included in the graphics group.

Figure 7:
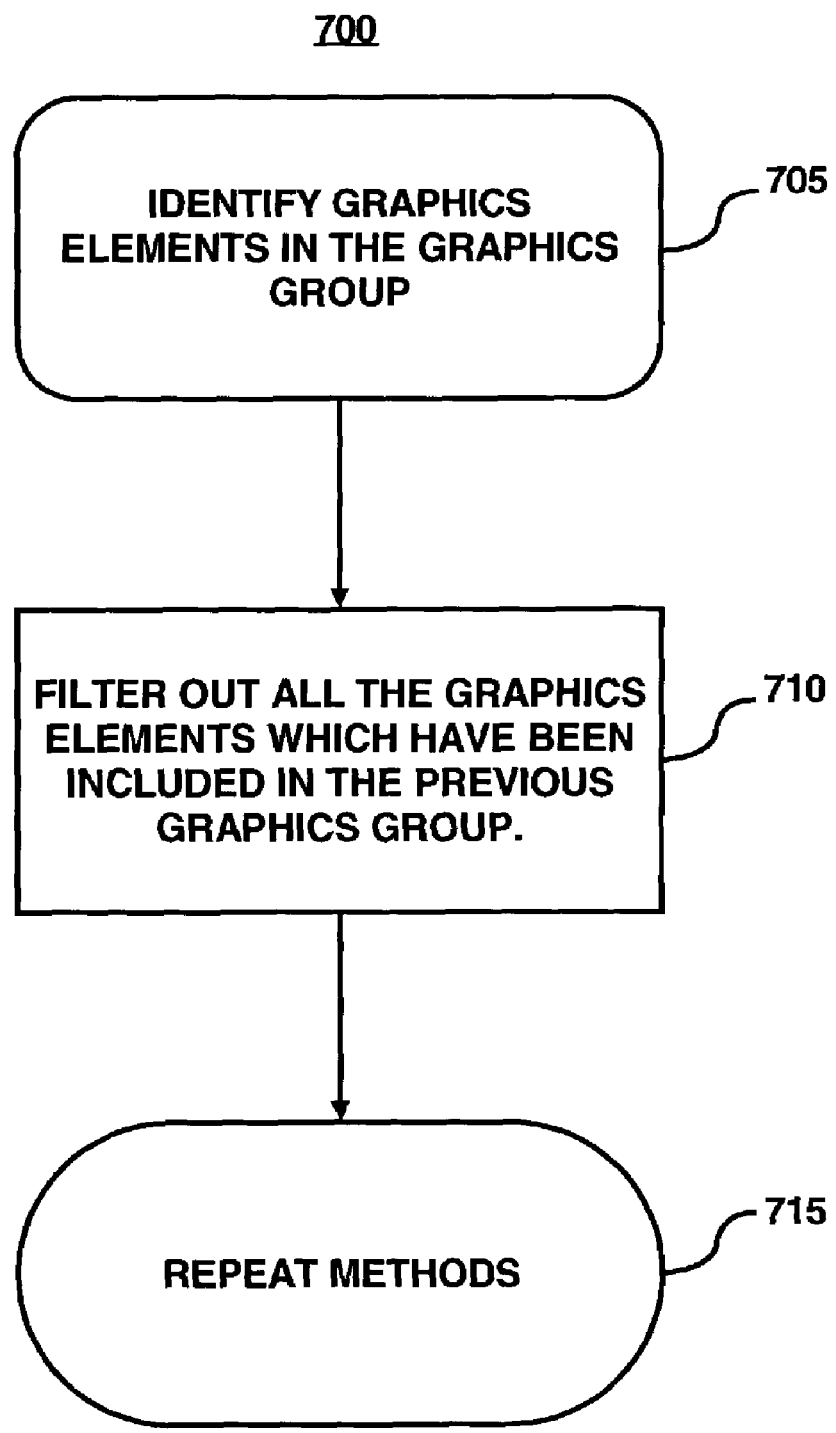
FIG. 7 is a flow diagram of a method for extracting elements of one or more additional graphics groups, according to an embodiment of the invention.

FIG. 7 illustrates a method 700 according to an embodiment of the invention. The method 700 may be performed after the methods illustrated in FIGS. 3–6. In step 705, the graphics extraction tool 100 identifies the graphics elements in the previous graphics groups, which includes graphics elements added to the graphics group from the methods illustrated in FIGS. 3–6. In step 710, the SDM 120 filters out the graphics elements identified in step 705 from the graphics elements in the page. In step 715, one or more of the methods illustrated in FIGS. 2–7 are performed on the remaining graphics elements. These steps may be repeated until no elements can be identified that belong in the graphics group. This method allows multiple figures, charts, etc., included in a single page to be extracted.

Figure 8:
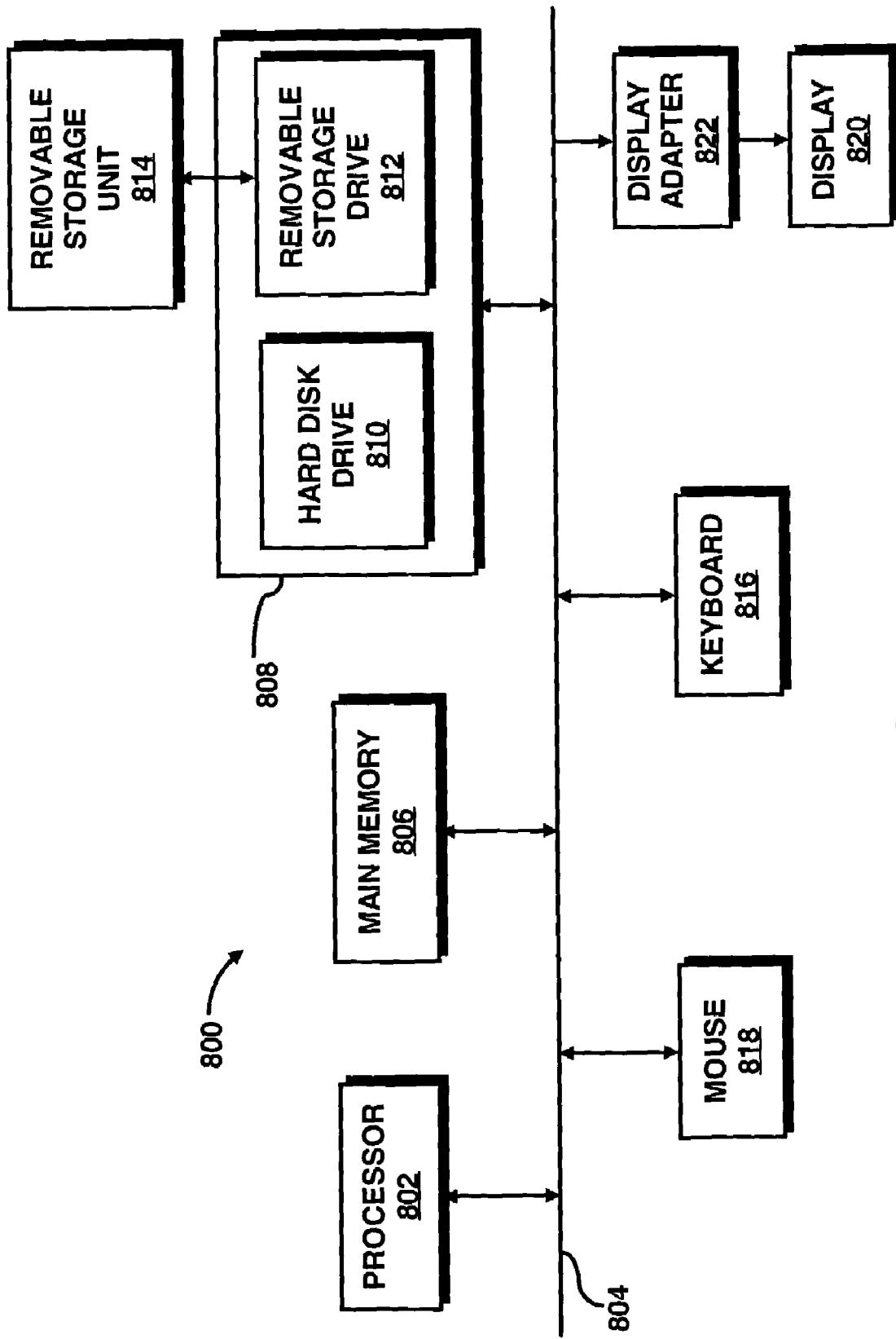
FIG. 8 is a block diagram of a computing platform, according to an embodiment of the invention.

FIG. 8 illustrates a computing platform 800 operable to perform the methods in FIGS. 3–7. The computing platform 800 includes one or more processors, such as processor 802, configured to provide an execution platform for a computing device. Commands and data from the processor 802 may be communicated over a communication bus 804.

The computing platform 800 also includes a main memory 806, preferably Random Access Memory (RAM), where the software (e.g., the graphics extraction tool 100 shown in FIG. 1, which may perform the methods shown in FIGS. 3–7) for the computing device 32 may be executed during runtime. In addition, electronic documents (e.g., pdf documents) may be stored in the memory 806. The software may automatically extract graphics elements and related text elements from one electronic document and incorporate them in another electronic document. These documents may be stored in the memory 806 and/or a secondary memory 808.

The secondary memory 808 may also be included in the computing platform 800. The secondary memory 808 includes, for example, a hard disk drive 810 and/or a removable storage drive 812, representing a floppy diskette drive, a magnetic tape drive, a compact disk drive, and the like. The removable storage drive 812 may store a copy of the software for the computing device 32. In addition, the removable storage drive 812 may read from and/or write to a removable storage unit 814, e.g., floppy disk, compact disc, etc.

A user may interface with the computing platform 800 through a keyboard 816, a mouse 818, and a display 820. A display adapter 822 may be interfaced between the communication bus 804 and the display 820 to receive display data from the processor 802 and to convert the display data into display commands visible on the display 820.

The steps described above and illustrated in FIGS. 3–7 may be compiled into computer programs. These computer programs can exist in a variety of forms both active and inactive. For example, the computer program can exist as software comprised of program instructions or statements in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical or magneto-optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. These changes and others may be made without departing from the spirit and scope of the invention.

What is claimed is:

1. A method of selecting elements from an electronic document, the method comprising steps of:
   identifying a largest sized graphics element in a page of the electronic document;
   creating a graphics region in the page, the graphics region including an expandable area in the page including at least the largest graphics element;
   determining whether at least one other graphics element is related to a graphics element in the graphics region; and
   automatically growing the graphics region to further include the at least one other graphics element.

2. The method of claim 1, further comprising a step of extracting graphics elements included within the grown graphics region.

3. The method of claim 2, wherein the step of extracting further comprises steps of:
   adding the graphics elements included within the grown graphics region to a graphics group; and
   extracting the elements in the graphics group to a new electronic document.

4. The method of claim 1, further comprising steps of:
   determining whether a plurality of graphics elements are in the graphics region;
   not extracting a graphics element from the page in response to determining less than a plurality of graphics elements are in the graphics region; and
   growing the graphics region by a predetermined amount in response to the graphics region having a plurality of graphics elements.

5. The method of claim 1, wherein the step of determining whether at least one other graphics element is related further comprises a step of determining whether at least one bounding box for the at least one other graphics element intersects the graphics region.

6. The method of claim 1, wherein the step of determining whether at least one other graphics element is related further comprises a step of:
   expanding the graphics region by a predetermined amount; and
   determining whether the expanded graphics region intersects the at least one other graphics element.

7. The method of claim 6, wherein the step of growing further comprises growing the graphics region to encompass the at least one other graphics element in response to the at least one graphics element intersecting the expanded graphics region.

8. The method of claim 6, wherein the step of expanding the graphics region by a predetermined amount further comprises steps of:
identifying a font size in a largest text element in the past; and
expanding the graphics region by approximately twice the identified font size.

9. The method of claim 8, wherein the step of identifying a font size further comprises identifying a most common font size among at least one text run in a largest text element.

10. The method of claim 1, further comprising a step of identifying non-graphics elements related to the at least one graphics element in the graphics region; and
automatically growing the graphics region to include the related non-graphics element.

11. The method of claim 10, wherein the step of identifying non-graphics elements further comprises steps of:
determining whether at least one non-graphics element is encompassed by the grown graphics region; and
adding the at least one non-graphics element to a graphics group in response to the at least one non-graphics element being encompassed by the grown graphics region, the graphics group including elements to be extracted.

12. The method of claim 10, wherein the step of identifying non-graphics elements further comprises steps of:
determining whether at least one non-graphics element having a predetermined size intersects the grown graphics region; and
adding the at least one non-graphics element to a graphics group in response to the at least one non-graphics element of a predetermined size intersecting the grown graphics region, the graphics group including elements to be extracted.

13. The method of claim 10, wherein the step of identifying non-graphics elements further comprises steps of:
determining whether at least one text element of a predetermined minimum size intersects the grown graphics region;
determining whether the at least one text element includes at least one text run intersecting the grown graphics region in response to the at least one text element of a predetermined size intersecting the graphics region; and
adding the text run to a graphics group in response to the text run intersecting the grown graphics region, the graphics group including elements to be extracted.

14. The method of claim 10, wherein the step of identifying non-graphics elements further comprises steps of:
determining whether at least one predetermined character string is in the page;
determining whether the at least one character string is in a vicinity of the grown graphics region in response to the at least one predetermined character string being in the page; and
adding the at least one predetermined character string to a graphics group in response to the at least one predetermined character string being in the vicinity of the grown graphics region, the graphics group including elements to be extracted.

15. The method of claim 1, further comprising steps of:
generating a graphics group, the graphics group including elements in the graphics region;
sorting the elements in the graphics group according to index values for an index, the index values including a value for each element in the page based on an order each element was laid on the page, and wherein the sorted elements include an element having a highest index value (Gmax) among the sorted elements and an element having a lowest index value (Gmin) among the sorted elements;
determining whether at least one element of a predetermined size, which is not in the grown graphics region, has an index value between Gmax and Gmin; and
adding the at least one element to the graphics group in response to the at least one element being in the vicinity of the grown graphics region.

16. The method of claim 15, further comprising steps of:
determining whether another at least one element of a predetermined size, which is not in the graphics region, has an index value that is approximately equal to one index value greater than Gmax or one index value less than Gmin;
determining whether the another at least one element is in a vicinity of the grown graphics region in response to the another at least one element having an index value approximately equal to one index value greater than Gmax or one index value less than Gmin; and
adding the another at least one element to the graphics group in response to the another at least one element being in the vicinity of the grown graphics region.

17. The method of claim 1, wherein die document is a pdf document.

18. An apparatus configured to select elements from an electronic document, the apparatus comprising:
means for identifying a largest sized graphics element in a page of the electronic document;
means for creating a graphics region that includes the largest graphics element;
means for determining whether at least one other graphics element is related to a graphics element in the graphics region; and
means for automatically growing the graphics region to farther include the at least one other graphics element.

19. The apparatus of claim 18, further comprising means for extracting graphics elements included within the grown graphics region.

20. The apparatus of claim 19, wherein the means for extracting further comprises means for adding the graphics elements to a graphics group and extracting the elements in the graphics group to a new electronic document.

21. The apparatus of claim 18, wherein the means for determining whether at least one other graphics element is related to a graphics element in the graphics region further comprises means for determining whether at least one bounding box for at least one other graphics element intersects the graphics region.

22. The apparatus of claim 18, wherein the means for determining whether at least one other graphics element is related to a graphics element in the graphics region further comprises means for expanding the graphics region by a predetermined amount and determining whether the expanded graphics region intersects the at least one other graphics element.

23. The apparatus of claim 22, wherein the means for automatically growing further comprises means for growing the graphics region to encompass the at least one other graphics element in response to the at least one graphics element intersecting the expanded graphics region.

24. The apparatus of claim 18, further comprising means for identifying non-graphics elements related to the at least one graphics element in the graphics region; and the means far automatically growing include means for automatically growing the graphics region to include the related non-graphics element.

25. The apparatus of claim 18, wherein the electronic document is a pdf document.

26. A computing device comprising:

a processor operable to identify and select a plurality of related graphics elements for extraction from a portable document format (pdf) electronic document, wherein selecting the plurality of related graphics elements includes automatically growing a graphics region in the electronic document to include the plurality of related graphics elements, the graphics region including an expandable area in the document; the processor being further operable to identify at least one non-graphics element related to a graphics element in the graphics region and automatically grow the graphics region to include the at least one related non-graphics element; and a memory storing the electronic document.

27. The computing device of claim 26, wherein the processor is operable to extract the elements in the graphics region to another electronic document stored in the memory.

28. The computing device of claim 27, wherein the document is a pdf document.

29. The method of claim 1, wherein identifying a largest graphics element in a page of the electronic document, comprises identifying the largest graphics element without user input.

30. The method of claim 1, wherein identifying a largest graphics element in a page of the electronic document, wherein identifying is performed by software executed on a computing system and identifying further comprises:

determining attribute information from the electronic document for graphics elements in the page;

determining sizes of each of the graphics elements based on the attribute information; and identifying the largest graphics element based on the determined sizes.

31. The method of claim 30, wherein determining attribute information from die electronic document for graphics elements in the page further comprises determining coordinate information for a bounding box for each of the graphics elements in the page.

32. The method of claim 1, wherein creating a graphics region;

determining whether at least one bounding box for at least one other graphics element is in a vicinity of die graphics region; and growing the graphics region are performed by the software.

33. Computer software embedded on a computer readable medium, the computer software when executed on a computing system comprising instructions performing:

identifying a largest sized graphics element in a page of the electronic document;

creating a graphics region in the page, the graphics region including an expandable area wherein at least the largest graphics element is in the expandable area;

determining whether at least one other graphics element is related to a graphics element in the graphics region; and automatically growing the graphics region to further include the at least one other graphics element.

34. The computer software of claim 33, further comprising instructions performing:

extracting graphics elements included within the grown graphics region into a new electronic document.

35. The computer software of claim 34, wherein instructions performing extracting further comprises instructions performing:

adding the graphics elements included within the grown graphics region to a graphics group; and extracting the elements in the graphics group to the new electronic document.

36. The computer software of claim 33, wherein instructions performing determining whether at least one other graphics element is related to a graphics element in the graphics region further comprises instructions performing determining whether at least one bounding box for the at least one other graphics element is in a vicinity of the graphics region.

37. The computer software of claim 36, wherein instructions performing automatically growing the graphics region farther comprises growing the graphics region to further include the at least one other graphics element in response to the at least one bounding box being in the vicinity of the graphics region.

38. The computer software of claim 33, wherein instructions performing identifying a largest graphics element in a page of the electronic document further comprises instructions performing:

determining attribute information from the electronic document for graphics elements in the page;

determining sizes of each of the graphics elements bused on the attribute information; and identifying the largest graphics element based on the determined sizes.

39. The computer software of claim 38, wherein instructions performing determining attribute information from the electronic document for graphics elements in the page further comprises determining coordinate information for a bounding box for each of the graphics elements in the page.

40. The computer software of claim 33, further comprising instructions performing:

determining whether a plurality of graphics elements are in the graphics region;

not extracting a graphics element from the page in response to determining less than a plurality of graphics elements are in the graphics region; and growing the graphics region by a predetermined amount in response to the graphics region having a plurality of graphics elements.

41. The computer software of claim 33, wherein instructions performing determining whether at least one the graphics element is related to a graphics element in the graphics region in a vicinity of the graphics region further comprises instructions performing determining whether at least one bounding box for the at least one other graphics element intersects the graphics region.

42. The computer software of claim 33, wherein instructions performing determining whether the at least one other graphics element is related to a graphics element in the graphics region further comprises instructions performing:

expanding the graphics region by a predetermined amount; and determining whether the expanded graphics region intersects the at least one other graphics element.

43. The computer software of claim 42, wherein the instructions performing automatically growing further comprises instructions performing growing the graphics region to encompass the at least one other graphics element in response to the at least one graphics element intersecting the expanded graphics region.

44. The computer software of claim 42 wherein the instructions performing expanding the graphics region by a predetermined amount further comprises instructions performing:
   identifying a font size in a largest teat element in die page; and
   expanding the graphics region by approximately twice the identified font size.

45. The computer software of claim 44, further comprising instructions performing identifying a font size further comprises identifying a most common font size among at least one text run in a largest text element.

46. The computer software of claim 33, further comprising instructions performing identifying non-graphics elements related to the at least one graphics element in the graphics region; and automatically growing the graphics region to include the related non-graphics elements.

47. The computer software of claim 46, wherein the instructions performing identifying non-graphics elements further comprises instructions performing:
   determining whether at least one non-graphics element is encompassed by the grown graphics region; and
   adding the at least one non-graphics element to a graphics group in response to the at least one non-graphics element being encompassed by the grown graphics region, the graphics group including elements to be extracted.

48. The computer software of claim 46, wherein the instructions performing identifying non-graphics elements further comprises instructions performing:
   determining whether at least one non-graphics element having a predetermined size intersects the grown graphics region; and
   adding the at least one non-graphics element to a graphics group in response to the at least one non-graphics element of a predetermined size intersecting the grown graphics region, the graphics group including elements to be extracted.

49. The computer software of claim 46, wherein the instructions performing identifying non-graphics elements further comprises instructions performing:
   determining whether at least one text element of a predetermined minimum size intersects the grown graphics region;
   determining whether the at least one text element includes at least one text run intersecting the grown graphics region in response to the at least one text element of a predetermined size intersecting the graphics region; and
   adding the text run to a graphics group in response to the text run intersecting the grown graphics region, the graphics group including elements to be extracted.

50. The computer software of claim 46, wherein the instructions performing identifying non-graphics elements further comprises instructions performing:
   determining whether at least one predetermined character string is in the page;
   determining whether the at least one character string is in a vicinity of the grown graphics region in response to the at least one predetermined character string being in the page; and
   adding the at least one predetermined character string to a graphics group in response to the at least one predetermined character string being in the vicinity of the grown graphics region, the graphics group including elements to be extracted.

51. The computer software of claim 33, further comprising instructions performing:
   generating a graphics group, the graphics group including elements in the graphics region;
   sorting the elements in the graphics group according to index values for an index, the index values including a value for each element in the page based on an order each element was laid on the page, and wherein the sorted elements include an element having a highest index value (Gmax) among the sorted elements and an element having a lowest index value (Gmin) among the sorted elements;
   determining whether at least one element of a predetermined size, which is not in the grown graphics region, has an index value between Gmax and Gmin; and
   adding the at least one element to the graphics group in response to the at least one element being in the vicinity of the grown graphics region.

52. The computer software of claim 50, further comprising instructions performing:
   determining whether another at least one element of a predetermined size, which is not in the graphics region, has an index value that is approximately equal to one index value greater than Gmax or one index value less than Gmin;
   determining whether the another at least one element is in a vicinity of the grown graphics region in response to the another at least one element having an index value approximately equal to one index value greater than Gmax or one index value less than Gmin; and
   adding the another at least one element to the graphics group in response to the another at least one element being in the vicinity of the grown graphics region.

* * * * *